April 28, 1964  G. E. MONROE ETAL  3,130,980
ELEVATABLE TRAILERS
Filed April 29, 1960  2 Sheets-Sheet 1
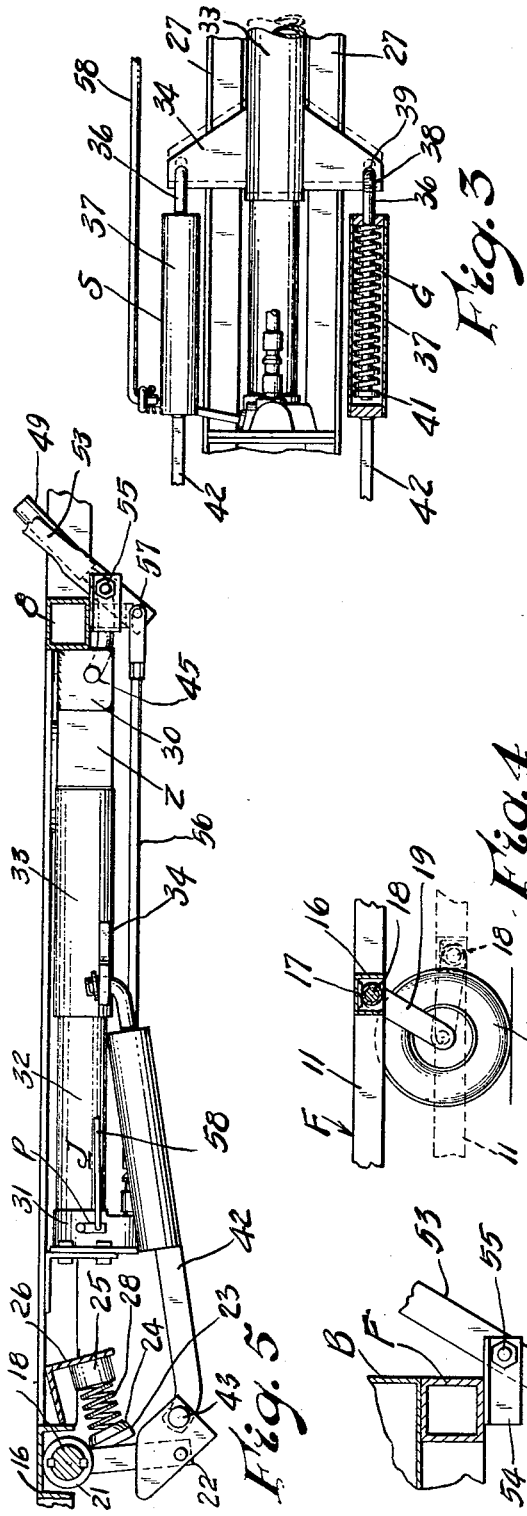
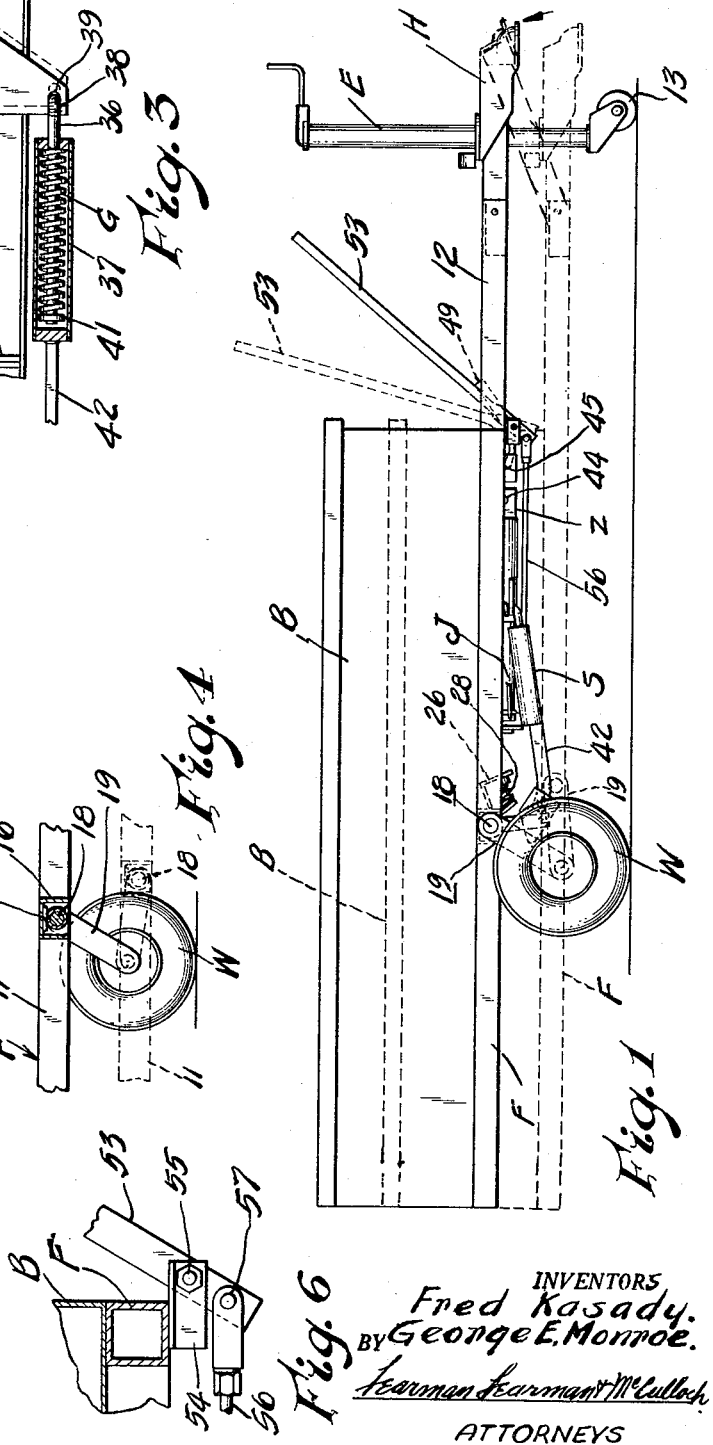
INVENTORS
Fred Kasady,
BY George E. Monroe.
Fearman Fearman & McCulloch
ATTORNEYS

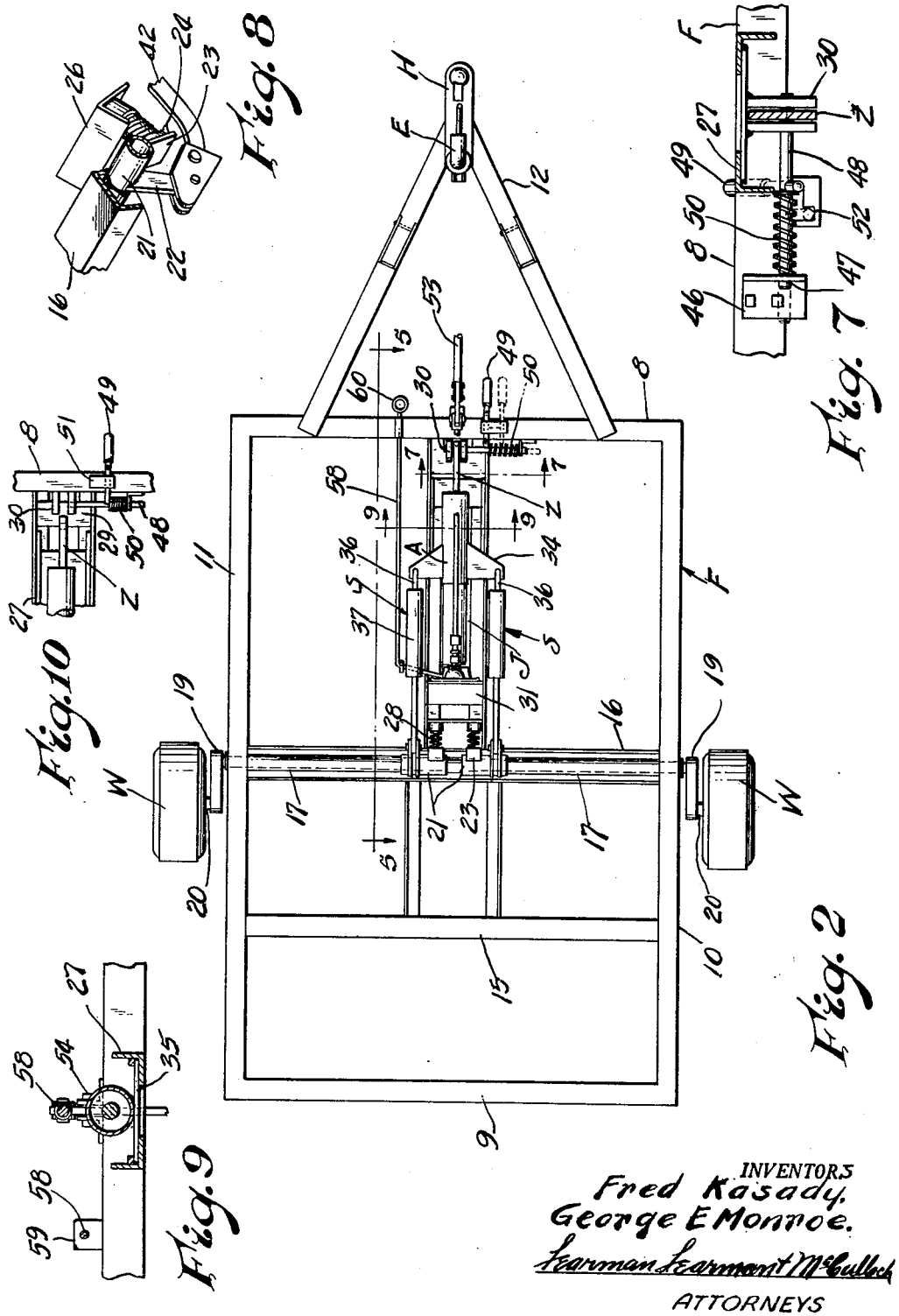

United States Patent Office 3,130,980
Patented Apr. 28, 1964

3,130,980
ELEVATABLE TRAILERS
George E. Monroe and Fred Kasady, Pinconning, Mich., assignors to Magline, Inc., Pinconning, Mich., a corporation of Michigan
Filed Apr. 29, 1960, Ser. No. 64,384
(Filed under Rule 47(a) and 35 U.S.C. 116)
4 Claims. (Cl. 280—43.23)

This invention relates to a vehicle trailer having independently sprung wheels, and means whereby the chassis and bed can be lowered from a normal load carrying level to a depressed loading and unloading level, whereby products and material can be loaded or unloaded without heavy lifting and in a minimum length of time.

One of the prime objects of the invention is to design a vehicle trailer of simple construction provided with means for easily and quickly raising the vehicle body from ground level to load carrying position, and provide spring loaded means associated therewith for absorbing road shocks and vibration, as well as means for protecting said springs against failure due to overload.

Still a further object is to provide an elevatable trailer having independently sprung wheels including preferably hydraulically actuated means for elevating the trailer body, and means independent of said hydraulically actuated means for securing said trailer body in elevated load carrying position.

A further object still is to design an elevatable trailer vehicle including offset shafts, and hydraulically actuated means releasably connected therewith for elevating said trailer vehicle, means for locking said trailer in its raised position, and resilient means interposed between said locking means and offset shafts for resiliently holding said body in raised position.

Another object of the invention is to provide an elevatable trailer body which can be easily loaded without loading hazards or risk of injury, and which can be positioned, held, loaded and unloaded at any selected level in the elevatable range or upward travel of the trailer body.

A further object of the invention is to provide simple, practical and rugged means which is very easy to operate, positive in action, and which is composed of a minimum number of simple parts, all of which can be readily assembled and replaced when necessary.

With the above and other object in view, the present invention consists in the combination and arrangement of parts hereinafter more fully described, illustrated in the accompanying drawings and more particularly pointed out in the appended claims, it being understood that changes may be made in the form, size and proportions without departing from the spirit or sacrificing any of the advantages of the invention.

FIG. 1 is a side elevational view of our elevatable trailer, the broken lines showing it in its lowered position.

FIG. 2 is an inverted plan view of the trailer with the body removed.

FIG. 3 is an enlarged, inverted, part-sectional, fragmentary plan view of the elevating mechanism.

FIG. 4 is a fragmentary, part-sectional, side elevational view, the broken lines showing the lowered position of the trailer frame.

FIG. 5 is an enlarged, fragmentary, part-sectional, side elevational view taken on the line 5—5 of FIG. 2.

FIG. 6 is an enlarged, fragmentary, side elevational view showing the pivoting of the jack pump handle.

FIG. 7 is a fragmentary, front elevational view of the guide bracket and shift lever.

FIG. 8 is a perspective view of one of the lift brackets.

FIG. 9 is a transverse sectional view taken on the line 9—9 of FIG. 2.

FIG. 10 is a fragmentary schematic view showing the jack in disconnected position.

Referring now more specifically to the drawings in which we have shown the preferred embodiment of our invention, the letter F indicates a preferably fabricated frame comprising front, rear and side members 8, 9, 10 and 11 respectively, welded together as shown, and on which a body B is secured as usual. A V-shaped tongue extension 12 is secured to the front end of the frame F and projects forwardly therefrom. A conventional hitch H is provided at the outer end of the tongue for attachment to a power vehicle in the conventional manner, and a jack member E is mounted on the tongue for the support and adjustment of the free end thereof and is provided with a caster 13 for contact with the ground.

Spaced-apart, transversely-disposed brace members 15, one of which is shown in FIG. 2, span the frame F at points intermediate its length, and a channel-shaped shaft support 16 is spaced forwardly of a brace 15, with a pair of aligned sleeve members 17—17 disposed in said member and welded thereto and to the side frames 10 and 11 respectively. Aligned shaft sections 18—18 are journaled in said sleeves, the one end of each shaft section projecting beyond the side frame members to accommodate the crank sections 19—19 which are welded thereon and form an extension of said shafts. Offset stub shafts 20—20 are rigidly connected to the sections 19—19 and accommodate wheel assemblies W in the conventional manner, and suitable lubricating means is provided for lubricating the shafts.

Lift brackets 21—21 are rigidly mounted on the shaft sections 18—18, each bracket having a projecting arm 22 welded thereto, which arm is pivotally connected to a jack housing assembly A in a manner to be presently described.

Welded on or cast integral with each bracket 21 is a laterally projecting flat plate section 23 disposed at an angle with relation to the arm 22, and having rubber seats 24 on the face thereof. Spring cups 25—25 are welded to a bracket 26 provided on longitudinally-disposed angles 27—27 which are also welded to the frame and brace members 8 and 16 respectively, and springs 28—28 are interposed between said seats and cups, to yieldingly limit rotation of said shafts, eliminate noise and also form shock absorbers for absorbing road shocks, etc.

A plate 29 spans the angels 27—27, and spaced-apart depending lug members 30—30 are secured thereto at a point directly adjacent the front end of the frame and for a purpose to be later described.

A conventional, pressure fluid, operating ram or jack J is rigidly secured to the frame 27—27 and includes a base and reservoir section 31. A cylindrical ram section 32 projects from said base, and has a jack ram assembly 33 telescopically mounted thereon, said assembly including laterally projecting wings 34—34 welded to the side walls of the jack ram.

Spring housing assemblies S are connected to the wings 34—34 by means of rods 36, said assemblies including a hollow cylinder or housing 37 in which a spring G is mounted, the one end of rod 36 being hook-shaped as at 38 so that it can be hooked into an opening 39 provided in one of the wings 34. The rod projects through an opening provided in one end of the cylinder 37 and through the spring G and is rigidly secured to a cap or washer 41, so that the spring G is interposed between the washer 41 and the one end of the cylinder.

A link 42 is preferably welded to the opposite end of the cylinder 37 with its free end pivotally connected to one of the arms 22 by means of a pin 43, and it will be obvious that the jack ram 33 is connected to the shaft sections 18 through the spring housing assemblies S, links 42, and lift brackets 21, the latter three elements, together with the rods 36, constituting yieldable force transmitting means interconnecting the ram and the members 22.

A horizontally disposed bar section Z is welded to the outer end of the jack ram assembly 33 and projects between the spaced-apart lugs 30—30, when the body is raised to load carrying position. An opening 44 is provided adjacent the forward end of said bar and is aligned with openings 45 provided in the lugs 30 to accommodate a releasable locking pin 48.

A bracket 46 is mounted on the frame member 8, and has an opening 47 in alignment with the openings 44 and 45, and the pin 48 is releasably mounted in said openings for connecting and/or disconnecting the bar Z from said lugs. A relatively short offset handle 49 is welded to the pin 48 at a point intermediate its length, and a spring 50 is interposed between the offset handle and bracket. The handle projects through a guide bracket 51 provided on the frame F, and is held in position by means of a stop 52 provided in said bracket, said handle being releasable from the stop 52 for lateral movement to retract the pin 48 and release the bar Z.

The pumping of the jack is accomplished by means of a foldable jack handle 53 which is pivotally connected by a bolt 55 to bracket 54 that is fixed on the frame F. A rod 56 is pivotally connected to the end of the handle 53 by means of pin 57. Rocking or pumping of the handle will extend the jack ram assembly.

A push rod 58 is slidably mounted in a guide bracket 59 provided on the frame. A ring 60 is formed on one end of the rod for easy manipulation thereof, the opposite end being connected to the pump lever P for actuating the valve (not shown) and releasing the fluid pressure to permit the pump jack ram to retract and the trailer body B to settle back to riding position. Upon releasing the pressure in the jack, all fluid is then free to return to the storage reservoir of the jack, and the connection then runs from the frame through the jack ram assembly, spring housing assemblies to the lift brackets.

The operation of the mechanism is substantially as follows:

With the trailer in its normal elevated position to transport a load, the following sequence of operations is necessary to permit lowering the body to ground level. The jack ram assembly must be disconnected from the frame. To accomplish this, the operator first pushes rod 58 rearwardly, then pumps the handle 53 in the conventional manner so that the jack ram assembly is forced forwardly until the assembly bar Z bears firmly against the front frame member 8, which forms a stop, and releases binding tension on the pin 48 which can then be freely withdrawn by moving the locking pin and handle 48 and 49 laterally to the right the distance permitted by the guard 51. By exerting a downward pressure on the handle, it will be retained in retracted position, with the pin 48 backed out of the openings 44 and 45 and completely disengaged from the bar Z.

The rod 58 is then pulled forwardly to permit the fluid to return to the jack reservoir, and the weight of the trailer and load will cause the jack assembly to retract so that the trailer bed will settle to ground level for unloading.

To elevate the trailer to load carrying position, the rod 58 is forced rearwardly to place the jack in condition for pumping. The jack handle is then actuated until the trailer body has reached the limit of its upward travel and ceases to rise, at which time the jack handle pressure will become excessive due to solid contact of the bar Z with the frame, and this automatically aligns the openings 44 and 45. The handle 49 is then raised to release pin 48, and the spring 50 forces the pin through openings 44 and 45, thus securing the ram assembly to the frame, and the locking action is accomplished. The spring pressure maintains the pin securely in place under any and all road and vibration producing conditions.

The next step is to pull the rod 58 forwardly to release the fluid pressure, and the trailer body will then settle to riding position and will be spring suspended, so that the hydraulic jack is free from stress of load, because when the rod is pulled outward, the fluid is free to return to the jack storage reservoir.

It will be understood that the forward travel of the jack ram assembly tends to compress the springs 37 is the cylinders 36, and as these are connected by link 42 to the lift arms 22, it will be obvious that the offset shaft sections 18 will be rotated and the trailer bed raised to riding position.

When the trailer bed is in riding position, the jack pressure is released, the bar Z is connected direct to the main frame, and the load is then supported by the jack ram assembly, springs and links 33, 36 and 42 respectively, and it will be understood that the springs 37 cannot be injured by overload conditions because when the springs 36 are compressed to their limit, no spring action will occur and there can thus be no failure.

From the foregoing description, it will be seen that we have provided a trailer vehicle, the bed of which can be hydraulically raised and lowered at will, wherein each wheel is independently connected and sprung, and in which the hydraulic means is disconnected and freed from load stress when the mechanism is in load carrying position.

What we claim is:

1. An elevatable trailer frame construction comprising a frame; lift means rockably journaled on said frame between the ends of the latter for rocking movement from a lowered position to a raised position; wheel journaling means on said lift means; pressure fluid operating means comprising an extensible and retractable ram having relatively telescoping first and second sections; means rigidly mounting said first ram section on said frame between said lift means and one end of said frame, said second ram section having a free end movable in a direction toward said one end of said frame when said lift means is in said lowered position; means releasably securing said free end of said second ram section to said frame adjacent said one end thereof when said lift means is in said raised position to prevent extension and retraction of said ram; and force transmitting means connected at one of its ends of said lift means and at its other end to said second ram section.

2. The construction set forth in claim 1 including yieldable means forming part of said force transmitting means.

3. The construction set forth in claim 2 wherein said yieldable means comprises a compression spring enclosed within a housing.

4. An elevatable trailer frame construction comprising a frame; lift means rockably journaled at two opposite sides of said frame between the ends of the latter for rocking movement from a lowered position to a raised position; wheel journaling means on said lift means; pressure fluid operating means comprising an extensible and retractable ram having relatively telescoping first and second sections; means rigidly mounting said first ram section on said frame between the sides thereof and between said lift means and one end of said frame, said second ram section having a free end movable in a direction toward said one end of said frame when said lift means is in said lowered position; means releasably securing said free end of said second ram section to said frame adjacent said one end thereof when said lift means is in said raised position to prevent extension and retraction of said ram; and force transmitting members connected at corresponding ends to said second ram section and at their other ends to the respective lift means.

References Cited in the file of this patent

UNITED STATES PATENTS

| | | |
|---|---|---|
| 2,227,762 | Ronning | Jan. 7, 1941 |
| 2,453,388 | Schramm | Nov. 9, 1948 |
| 2,506,699 | Byrd | May 9, 1950 |
| 2,591,916 | Caughman | Apr. 8, 1952 |
| 2,621,942 | Getz | Dec. 16, 1952 |
| 2,636,745 | Cartwright | Apr. 28, 1953 |
| 2,681,159 | McCrossen | June 15, 1954 |
| 2,704,021 | Brundage | Mar. 15, 1955 |
| 2,767,538 | Scheidenhelm | Oct. 23, 1956 |
| 2,793,774 | Lovegreen | May 28, 1957 |
| 2,835,399 | Buchholz | May 20, 1958 |
| 2,835,400 | Latzke | May 20, 1958 |
| 2,936,919 | Bowman | May 17, 1960 |
| 2,957,593 | Evans | Oct. 25, 1960 |
| 2,994,544 | Wolf | Aug. 1, 1961 |

FOREIGN PATENTS

| | | |
|---|---|---|
| 1,203,679 | France | Aug. 3, 1959 |